(12) United States Patent
Golan

(10) Patent No.: US 6,194,065 B1
(45) Date of Patent: Feb. 27, 2001

(54) METHOD FOR MANUFACTURING AN AGGLOMERATE

(75) Inventor: Asher Golan, Zichron Yaacob (IL)

(73) Assignee: Green Top Wood Recycling Ltd., Migdal Haemek (IL)

( * ) Notice: Subject to any disclaimer, the term of this patent is extended or adjusted under 35 U.S.C. 154(b) by 0 days.

(21) Appl. No.: 09/453,520

(22) Filed: Dec. 3, 1999

Related U.S. Application Data

(62) Division of application No. 09/156,044, filed on Sep. 17, 1998, now Pat. No. 6,030,565, which is a continuation of application No. 08/689,660, filed on Aug. 13, 1996, now abandoned.

(51) Int. Cl.$^7$ ........................................ D02G 3/00
(52) U.S. Cl. .................. 428/359; 428/360; 428/361; 428/400; 428/401; 428/402
(58) Field of Search ............... 264/117, 211.12, 264/211.21; 428/359, 360, 361; 119/171

(56) References Cited

U.S. PATENT DOCUMENTS

| | | |
|---|---|---|
| 2,972,584 | 2/1961 | Wunder et al. . |
| 4,560,527 | 12/1985 | Harke et al. . |
| 4,599,002 | 7/1986 | Gutknecht . |
| 4,621,011 | 11/1986 | Fleischer et al. ................ 428/221 |
| 4,676,196 | 6/1987 | Lojek et al. ........................ 119/1 |
| 4,721,059 | 1/1988 | Lowe et al. . |
| 5,152,250 | 10/1992 | Loeb .............................. 119/171 |
| 5,176,107 | 1/1993 | Buschur ......................... 119/173 |
| 5,361,719 | 11/1994 | Kiebke ........................... 119/171 |
| 5,545,385 | 8/1996 | Wunder et al. . |
| 5,552,099 | 9/1996 | Wunder et al. . |

FOREIGN PATENT DOCUMENTS

| | | |
|---|---|---|
| 41 42 999 A1 | 7/1993 | (DE) . |
| 564 713 A2 | 10/1993 | (EP) . |
| 1445330 | 8/1976 | (GB) . |
| 94/07595 | 4/1994 | (WO) . |
| WO 94/14529 | 7/1994 | (WO) . |

OTHER PUBLICATIONS

Internation Search Report dated Jun. 26, 1997.

Primary Examiner—Richard Weisberger
(74) Attorney, Agent, or Firm—Nath & Associates; Gary M. Nath; Deborah H. Yellin

(57) ABSTRACT

An agglomerate and a process for its manufacture by providing a dry particulated fibrous organic material, mixing it with a powdered mineral to obtain a first mixture, adding a binding agent to the first mixture to obtain a second mixture, agglomerating the second mixture in an agglomeration dish and drying the agglomerate to a desired dried state.

4 Claims, 1 Drawing Sheet

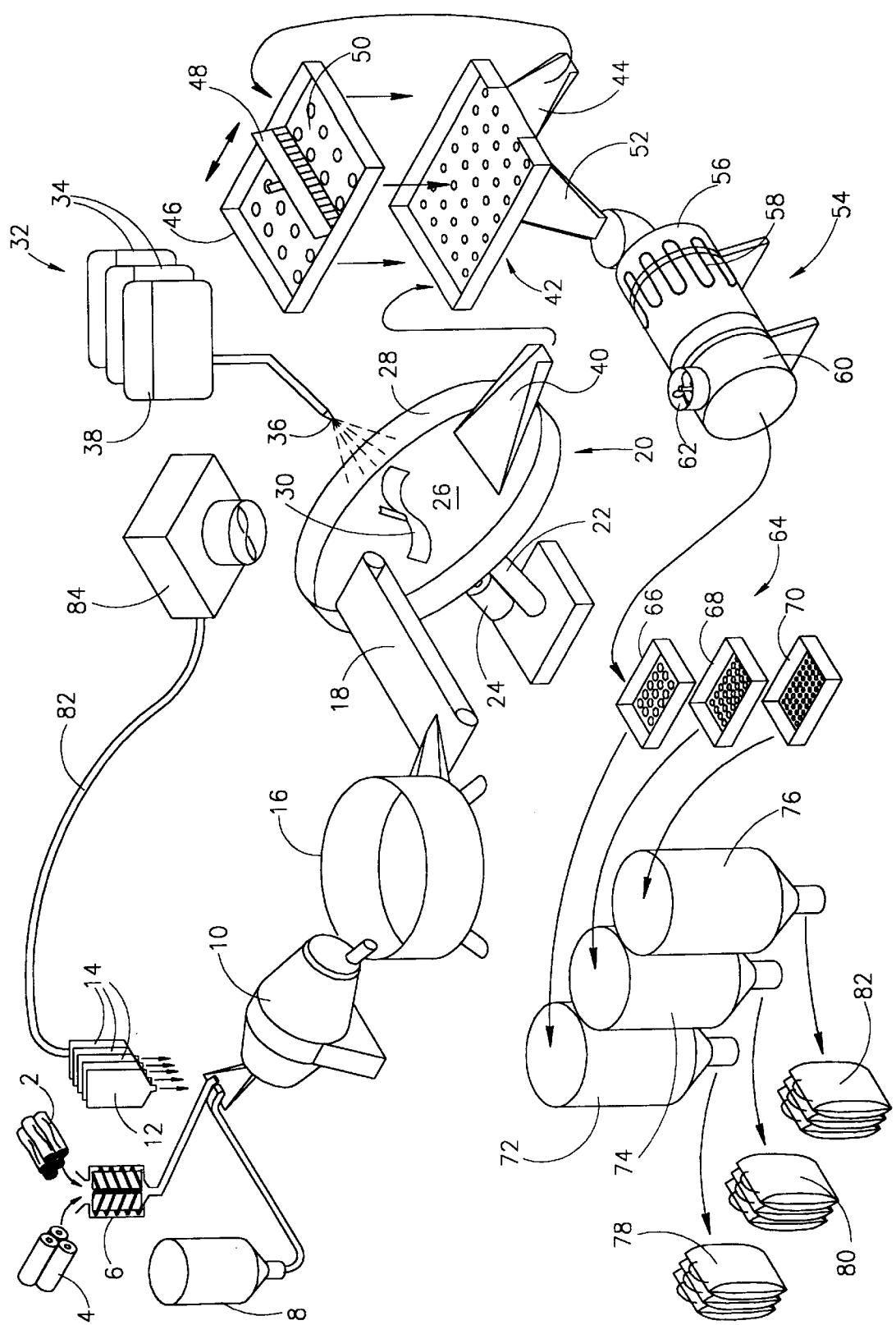

METHOD FOR MANUFACTURING AN AGGLOMERATE

This application is a divisional application of U.S. patent application Ser. No. 09/156,044, filed Sep. 17, 1998 now U.S. Pat. No. 6,030,565 which is a continuation of Ser. No. 08/689,660 filed Aug. 13, 1996, abandoned, the entire contents of which are hereby incorporated in their entirety.

FIELD OF THE INVENTION

The present invention is in the field of agglomeration and more specifically it is concerned with uniform agglomerates of fibrous organic material and mineral material, and a method for their manufacture.

BACKGROUND OF THE INVENTION

Agglomerates of the above specified type are commonly used in the food, chemical, agrochemical and pharmaceutical industries and have many applications, e.g. fertilizers, liquid absorbents (for industrial environments and ecological purposes), herbicides, insecticudes, compost, animal feed, soil mixtures, etc.

However, each application requires an agglomerate having specific qualities, e.g. liquid absorption ability, color, smell, size, shape, taste, weight, hardness, low dust discharge, etc.

Preparing a uniform agglomerate in which each of the above qualities may be controlled, requires first particulating the fibrous material and reducing the size of the other components (mineral material and additives) into small, substantially homogeneous particles, thoroughly mixing and binding with a suitable binder, forming the agglomerate into the required size and shape and finally, drying.

Several agglomeration processes are known. According to one type of process, all the agglomeration ingredients are comminuted and mixed together with a binding agent in a wet form. Then, the mixture is introduced into a lower end of a long inclined drum, which drum comprises heating means and is rotatable along its longitudinal axis. The mixture agglomerates as it ascends along the rotating drum and as it exits from the top end of the drum, it is dry and ready for use.

Another agglomeration method uses a long, inclined conveyor belt for agglomerating the mixture, with heating means provided along the belt for drying the agglomerate.

Both these processes share several drawbacks. First, when using light fibrous organic materials such as paper or cotton, the agglomerate obtained is non-uniform that, owing to the relatively long agglomerating means. Second, the amount of energy required for these processes is substantially high, particularly since the agglomeration drum or belt are essentially long and heat is applied practically throughout their entire length for drying the agglomerate. Furthermore, the equipment is large and heavy and thus requires large space.

Still furthermore, approximately 15–20% of the agglomerate produced according to the above methods is off-size or out of shape and thus requires reprocessing by first re-comminuting the dry agglomerate and then agglomerating it again as above described, since the agglomerate can not be screened during the process in wet form, i.e. prior to drying.

Also, the high temperatures and relatively prolonged drying period required for drying the agglomerate is not suitable for certain materials, e.g. paper fiber, since they are likely to burn. Qualities of other organic materials may be damaged by the excessive heat.

Moreover, these processes provide less control of the above-mentioned qualities, in particular the important parameters of granules size, specific weight, liquid absorption ability and color.

It is the object of the present invention to provide a novel, essentially uniform aggregate of organic fibers and mineral powdered material, with the above-referred to disadvantages being significantly reduced or overcome. It is a further object of the invention to provide a process for the manufacture of such an agglomerate.

SUMMARY OF THE INVENTION

According to the present invention there is provided a process for obtaining an agglomerate comprising:
(a) providing a substantially dry particulated fibrous organic material;
(b) mixing the fibrous material with a powdered mineral to obtain a first mixture;
(c) adding a binding agent to the first mixture to obtain a second mixture;
(d) agglomerating the second mixture in an agglomeration dish; and
(e) drying the agglomerate to a desired dried state.

A further provision of the invention is that the dry particulated fibrous material is provided by processing a non-particulated fibrous organic material so as to separate the fibers from one another to obtain said particulated material.

The binding agent may be added in dry form to the first mixture and the second mixture is than humidified during the agglomeration step. Alternatively the binding agent is a liquid applied during the agglomeration step.

In order to obtain specific qualities of the agglomerate, any of a variety of dry additives are added to the fist mixture, or wet additives to the second mixture, wherein said additives are one or more members selected from the group consisting of fire retardants, color agents, odor absorbent, odor repellents, medical compositions, nutritives, flavoring agents, hardening agents, and moisture absorbents.

In order to minimize the amount of dust throughout the agglomeration process and to minimize environmental effect, the process further comprises removing by suction of dust emitted during the process and returning it to the mixing step.

In a preferred embodiment of the present invention, the dry non-particulated fibrous organic material is processed into particulated fibrous form in a thermo screw press, wherein the organic material is compressed between a pair of rotating screw members forcing it through throttle plates and drying it.

In still a preferred embodiment, the agglomerate discharged from the agglomeration dish is screened prior to drying, wherein off-size and off-shaped particles are disintegrated in wet state into the required size and shape.

For the process according to the present invention, the non-particulated fibrous organic material is one or more members selected from the group consisting of cellulose material or synthetic polymers, wherein the cellulose material is wood, paper or cotton, and the powdered mineral material is one or more members selected from the group consisting of fly ash, quarry dust, clay dust and construction industry waste, such as gypsum, cement etc. The binding agent is an organic substance selected from the group consisting of chemical and organic adhesives, resins and starches, such as, for example, paper pulp waste.

Still preferably, the particulated, dry fibrous organic material has an average length of about 1 mm. and the particle size of the powdered mineral material is less than about 50 $\mu$m. Furthermore, the non-particulated material comprises less than about 40% moisture, whereas after processing, the moisture content of the particulated material is less than about 15%.

The present invention further provides an agglomerate manufactured by the above process and is characterized in that the agglomerated granules are uniform in size.

In a preferred compound, the agglomerate manufactured according to the present invention has a specific weight of about 0.15–1.2 kg/l, and has a liquid absorbing capability of about 2.5–0.6 liter per 1 kg. of agglomerate, respectively.

In still a preferred embodiment, the organic material used for the agglomeration is derived from processed waste wood and the binding agent is paper pulp waste.

BRIEF DESCRIPTION OF THE DRAWING

For better understanding, the invention will now be described in a non-limiting way, with reference to the accompanying drawing which is an isometric schematic layout of the agglomeration process according to the present invention.

DETAILED DESCRIPTION OF THE INVENTION

Making reference to the drawing, a first step of the agglomeration process is processing a non-particulated fibrous organic material, for example wood logs 2 or paper rolls 4, which may be processed, preferably but not exclusively, in a screw extruder 6 also known as a thermo screw press, disclosed in U.S. Pat. No. 4,599,002, which is incorporated herein by reference.

The non-particulated organic material (2, 4), may comprise up to 40% moisture and is processed into fine particulated fibers having an average length of less than about 1 mm. and containing only up to 15% moisture.

A powdered mineral material such as fly ash, quarry dust, clay dust, and construction industry waste, e.g. limestone, gypsum, mica, cement etc., has a particle size of less then about 50 $\mu$m is contained in silo 8.

The particulated fibrous organic material together with the powdered mineral material are introduced into a mixer 10 such as a so-called "ribbon blender", particularly suitable for thorough mixing of dry materials, having different specific weights. A dry binding agent supplied from a container 12 is added into the mixer 10, the binding agent being an organic substance selected from the group consisting of chemical adhesives, resins and starches, such as aminosulphonate, paper pulp waste etc., depending on the application for which the agglomerate is used.

A variety of additives, in dry form, are stored in separate containers 14, the additives being, for example, fire retardants, color agents, odor absorbent, odor repellents, medical compositions, nutritives, flavoring agents, hardening agents and moisture absorbents, added according to the application of the agglomerate. The additives are poured into the mixer 10, wherein the particulated organic material together with the powdered mineral material, the binder and additives are thoroughly mixed to obtain a uniform mixture.

The essentially dry mixture obtained from the mixer 10 is collected into bin 16 from which it is discharged by a conveyor belt 18 to an agglomeration dish generally designated 20. The agglomeration dish 20 is supported by leg 22 inclined at an adjustable angle and is rotatable by means of motor 24 at an adjustable speed. The dish has a flat, planner surface 26 and a perimeter wall 28 substantially perpendicular to the surface 26. A non-rotating scraper 30 having a controlable angle with respect to the dish is positioned very proximate to the surface 26 of the dish, for conducting the agglomerating matter falling on the dish from belt 18.

A liquid application station 32 comprises several liquid containers 34 and a nozzle 36 positioned over the agglomerating dish 20, for applying the liquids 38 stored within the tanks 34 onto the agglomerated matter. The liquids 38 may be for example, a humidifier required for the dry binder, or a binder in wet form (whereby dry binder may be omitted in the mixing step). The liquid 38 may also be any of the hereinbefore mentioned additives applied in wet form by the liquid application station 32 (which also may be added in either or both dry form in the mixing step or wet form in the agglomeration step).

The actual agglomeration depends on several parameters as will hereinafter be explained in more detail. However, the mixture poured from the conveyor belt 18 onto the rotating dish agglomerates and then falls into a collecting conduct 40 which is positioned approximately at the center line of the dish 20.

The agglomerated granules, still in wet form, are transferred to a screen 42, wherein off-size and off-shaped granules are separated and transferred via a conduct 44 to a disintegrating device 46 in which the wet granules, are distructed by a brush-like member 48 reciprocating over a perforated surface 50, the perforations being of a desired size and shape, depending on the specific application of the agglomerate.

The extruded granules then fall again into the screen 42 and along with the granules which have obtained proper size and shape in the agglomeration step, fall via conduct 52 into a drier 54 which is a tunnel comprising a first, heating compartment 56 provided with a heating element 58 and a second, cooling compartment 60, provided with a fan 62.

The dried agglomerate granules are then transferred from the drier 54 to a final screening station 64, comprising three vibrating screens 66, 68 and 70, having large, medium and small perforations respectively, for separating the granules accordingly.

Then the agglomerates are transferred into storage silos 72, 74 and 76, respectively, ready for consumption or packing into bags 78, 80 and 82, as may be required.

In a specific embodiment of the invention, the process further comprises a suction fan 84 positioned above the agglomeration dish 20, for collecting dust emitted during the agglomeration process and returning it via conduit 86 to one of the containers 14, for regaining.

The size of the agglomerate discharged from the agglomerating dish 20 depends on several factors. The inclination of the dish as well as the speed of rotation have direct influence on the size of the agglomerates. The larger the angle between the horizon and the normal of the dish's surface, the bigger are the agglomerate granules and vice-versa. Similarly, the faster the dish rotates, the bigger are the granules. Fast rotation of the dish is an important parameter enabling the use of substantially light organic fibers, e.g. of paper or cotton. The depth of the agglomeration dish (height of wall 28) also influences the size of the granules, wherein a deep dish yields bigger granules.

It was found that an agglomeration dish having a ratio of parameter versus height of approximately 7:1, rotating at approximately 32 rpm, yields best results.

It was also found that an agglomerate manufactured according to the invention typically having a specific weight of about 0.15–1.2 kg/l, would have a liquid absorbing capability of about 2.5–0.6 liter of liquid per 1 kg. of agglomerate, respectively.

As an example for preparing an agglomerate according to the present invention, kitty-litter absorbent may be manufactured by using 30% by weight of wood waste as organic fibrous material, 63% quarry dust as a mineral material and 8% binder being paper pulp waste.

As an example for manufacturing an agglomerate for industrial purposes an industrial liquid absorbent may be prepared by using 30% of wood waste as an organic fibrous material, 60% quarry dust as a mineral material, 8% binder and 2% fire retardant.

What is claimed is:

1. An agglomerate manufactured according to a process comprising:
   (a) providing a substantially dry and particulate, loose fibrous organic material processed in a thermo screw press, said fibrous material having a particle size smaller than about 1 mm and containing less than about 15% moisture, whereby said fibrous material has an essentially low bulk weight;
   (b) mixing the fibrous material with powdered mineral, so as to obtain a first mixture containing less than about 8% moisture;
   (c) adding a binding agent to the first mixture to obtain a second mixture, said second mixture being in an essentially dry state;
   (d) agglomerating the second mixture in an inclined agglomeration dish and applying to said second mixture one or more aqueous liquid additives; and
   (e) drying the agglomerate to a desired state, wherein said agglomerate has a specific weight of about 0.15–1.2 kg/l and a liquid absorbing capability of about 2.5–0.6 liters of liquid per 1 kg of agglomerate.

2. An agglomerate of fibrous organic material and powdered mineral material, having a specific weight of about 0.15–1.2 kg/l, and having a liquid absorbing capability of about 2.5–0.6 liter of liquid per 1 kg. of agglomerate, respectively.

3. An agglomerate according to claim 2, wherein the agglomerated granules are of a substantially uniform size.

4. An agglomerate according to claim 2, wherein said fibrous material is derived from wood waste and the binding agent is paper pulp waste.

* * * * *

UNITED STATES PATENT AND TRADEMARK OFFICE
CERTIFICATE OF CORRECTION

PATENT NO.    : 6,194,065 B1
DATED         : February 27, 2001
INVENTOR(S)   : Asher Golan It is certified that error appears in the above-identified patent and that said Letters Patent is hereby corrected as shown below:

Title page,
Item [30], Foreign Application Priority Data, should read as follows
-- Aug. 21, 1995         [IL]     Israel ……………………….. 115003 --

Signed and Sealed this

Nineteenth Day of April, 2005